US010783179B2

(12) United States Patent
Akolkar et al.

(10) Patent No.: US 10,783,179 B2
(45) Date of Patent: Sep. 22, 2020

(54) AUTOMATED ARTICLE SUMMARIZATION, VISUALIZATION AND ANALYSIS USING COGNITIVE SERVICES (71) Applicant: International Business Machines Corporation, Armonk, NY (US)

(72) Inventors: Rahul P. Akolkar, Austin, TX (US); Srijith N. Prabhu, Austin, TX (US); Joseph L. Sharpe, III, Loveland, OH (US); Bruce R. Slawson, Palmdale, CA (US); Jagan M. R. Vujjini, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1451 days.

(21) Appl. No.: 14/816,213

(22) Filed: Aug. 3, 2015

(65) Prior Publication Data
US 2017/0039275 A1 Feb. 9, 2017

(51) Int. Cl.
*G06F 16/34* (2019.01)
(52) U.S. Cl.
CPC .................. *G06F 16/345* (2019.01)
(58) Field of Classification Search
None
See application file for complete search history.

(56) References Cited

U.S. PATENT DOCUMENTS

| 6,205,456 | B1 | 3/2001 | Nakao |
| 6,751,776 | B1 | 6/2004 | Gong |
| 7,788,262 | B1 | 8/2010 | Shirwadkar |
| 8,245,135 | B2 | 8/2012 | Cai et al. |
| 8,495,490 | B2 | 7/2013 | Acquaviva |
| 8,977,540 | B2 | 3/2015 | Yasin |
| 2003/0130837 | A1 | 7/2003 | Batchilo et al. |
| 2009/0287678 | A1 | 11/2009 | Brown et al. |
| 2011/0066587 | A1 | 3/2011 | Ferrucci et al. |
| 2011/0125734 | A1 | 5/2011 | Duboue et al. |
| 2013/0006973 | A1 | 1/2013 | Caldwell et al. |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |

(Continued)

OTHER PUBLICATIONS

Specia et al, A Hybrid Approach for Relation Extraction Aimed at the Semantic Web (Year: 2006).*

(Continued)

*Primary Examiner* — Li B. Zhen
*Assistant Examiner* — Mikayla Chubb
(74) *Attorney, Agent, or Firm* — Stephen R. Tkacs; Stephen J. Walder, Jr.; Diana R. Gerhardt (57) ABSTRACT

A mechanism is provided in a data processing system for article summarization. The mechanism analyzes an article to identify entities and relationships within the article. The article is an item of unstructured content. The mechanism performs information augmentation based on the identified entities and relationships using one or more cognitive services to collect augmented information from a corpus of information. The mechanism generates one or more visualization components based on the identified entities and relationships and the augmented information. The mechanism presents a summarization comprising the one or more visualization components to a user.

20 Claims, 4 Drawing Sheets

(56) References Cited

U.S. PATENT DOCUMENTS

| | | | | |
|---|---|---|---|---|
| 2013/0158984 | A1* | 6/2013 | Myslinski | G06F 11/3065 704/9 |
| 2015/0049087 | A1 | 2/2015 | Chaturvedi et al. | |
| 2015/0049951 | A1 | 2/2015 | Chaturvedi et al. | |
| 2015/0066501 | A1 | 3/2015 | Thapliyal | |

OTHER PUBLICATIONS

Strotgen et al, Extraction and Exploration of Spatio-Temporal Information in Documents (Year: 2010).*
Wei et al, Discovering Event Evolution Patterns From Document Sequences (Year: 2007).*
Golbeck et al, Predicting Personality from Twitter (Year: 2011).*
Van Dalen-Oskam, Names in Novels, an Experiment in Computational Stylistics (Year: 2012).*
Lee et al, Automatic Identification of Text Genres and Their Roles in Subject-Based Categorization (Year: 2004).*
"Auto Summarizing News Articles Using Natural Language Processing (NLP)", http://knackforge.com/blog/selvam/auto-summarizing-news-articles-using-natural-language-processing-nlp, May 12, 2014, 8 pages.
"Automated Text Summarization (SUMMARIST)", http://www.isi.edu/natural-language/projects/SUMMARIST.html, downloaded from the internet on Apr. 2, 2015, 3 pages.
"Automatic Summarization", Wikipedia, http://en.wikipeda.org/wiki/Automatic_summarization, downloaded from the internet on Apr. 2, 2015, 13 pages.
Das, Dipanjan et al., "A Survey on Automatic Text Summarization", Language Technologies Institute, Carnegie Mellon University, Nov. 21, 2007, 31 pages.
High, Rob, "The Era of Cognitive Systems: An Inside Look at IBM Watson and How it Works", IBM Corporation, Redbooks, Dec. 12, 2012, 16 pages.
McCord, M.C. et al., "Deep parsing in Watson", IBM J. Res. & Dev. vol. 56 No. 3/4 Paper 3, May/Jul. 2012, pp. 3:1-3:15.
Yuan, Michael J., "Watson and healthcare, How natural language processing and semantic search could revolutionize clinical decision support", IBM developerWorks, IBM Corporation, Apr. 12, 2011, 14 pages.

* cited by examiner

AUTOMATED ARTICLE SUMMARIZATION, VISUALIZATION AND ANALYSIS USING COGNITIVE SERVICES

BACKGROUND

The present application relates generally to an improved data processing apparatus and method and more specifically to mechanisms for automated article summarization, visualization, and analysis using cognitive services.

The Internet allows for easy and immediate dissemination of information. Much of the information is in natural language or other unstructured content. In various professions, being up to speed with the latest developments is instrumental to success and often a key differentiator. For example, the ability to process information quickly is critical for high-frequency trading or the race towards innovation in emerging technologies. The most time-consuming human cognitive functions are those that require reading, processing, and understanding of various articles, such as news articles, research papers, or other publications.

Some article formats, such as peer-reviewed journals, provide summarization of the article via welt-defined notions such as an abstract and a conclusion. These often allow for only cursory understanding of the subject matter discussed, whereas the details reside in the body of the publication.

SUMMARY

In one illustrative embodiment, a method, in a data processing system, is provided for article summarization. The method comprises analyzing, by the data processing system, an article to identify entities and relationships within the article. The article is an item of unstructured content. The method further comprises performing, by the data processing system, information augmentation based on the identified entities and relationships using one or more cognitive services to collect augmented information from a corpus of information. The method further comprises generating, by the data processing system, one or more visualization components based on the identified entities and relationships and the augmented information. The method further comprises presenting, by the data processing system, a summarization comprising the one or more visualization components to a user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for consuming an article, such as a news report, research paper, case study, short story, novel, or other publication. The mechanisms provide detailed cognitive summarizations and visualizations to help in individual processing or collective analysis. The mechanisms deconstruct the semantic and cognitive processing related to the article using various cognitive services and related offerings. The mechanisms perform deep semantic parsing and detect entities and relationships within the article.

Different types of entities may receive further treatments with the cognitive serves. For real people entities, such as a subject of a news article, the mechanisms crawl or research biographical information, social media profiles, quotes, and other information using User Modeling services. For fictitious people entities, such as the protagonist of a novel, the mechanisms may analyze for key personality traits using quotations and User Modeling/Message Resonance services. The mechanisms may tag the location entities on a map pointing back to article excerpts. The mechanisms may collect date or timestamp entities to produce a timeline. The mechanisms present one or more of the above artifacts in a consolidated manner for the viewer as an overall summarization of the key contents within the article. The summary lends itself to more efficient processing of the articles and also enables more efficient and automated collective analyses of articles where they may be desired.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
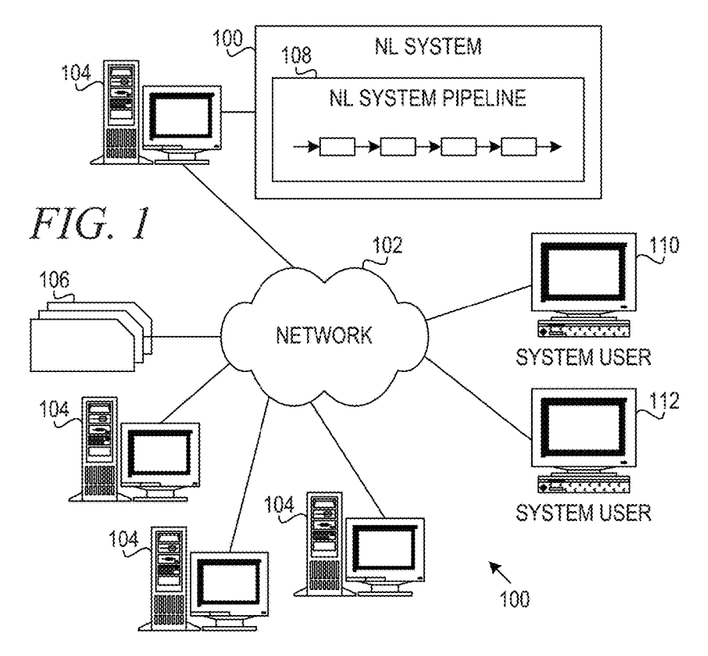
FIG. 1 depicts a schematic diagram of one illustrative embodiment of a natural language system in a computer network.
Figure 2:
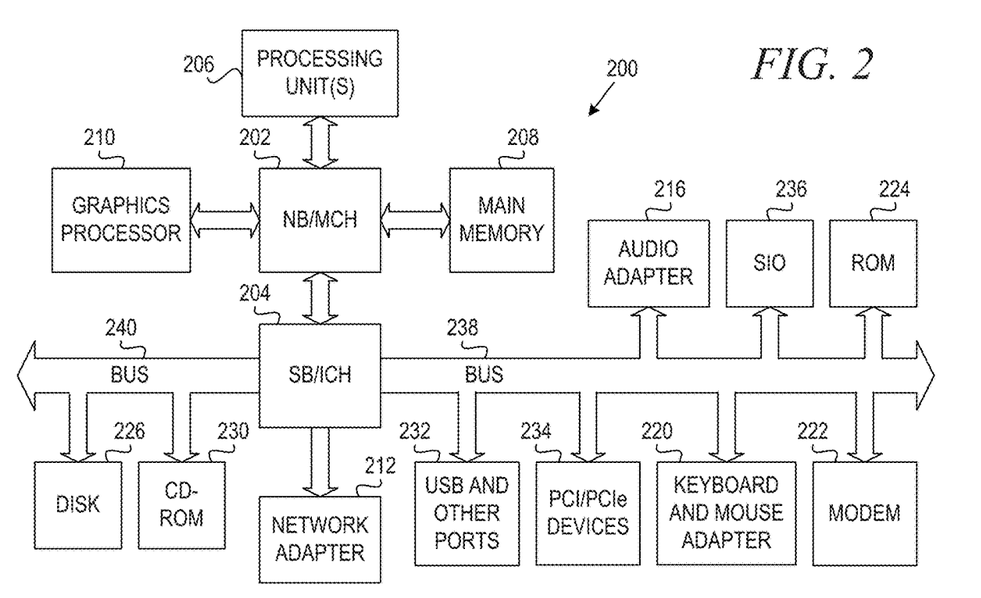
FIG. 2 is a block diagram of an example data processing system in which aspects of the illustrative embodiments are implemented.

The illustrative embodiments may be utilized in many different types of data processing environments. In order to provide a context or the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIGS. 1 and 2 are directed to describing an example Natural Language (NL) system methodology, and computer program product with which the mechanisms of the illustrative embodiments are implemented. As will be discussed in greater detail hereafter, the illustrative embodiments are integrated in, augment, and extend the functionality of these NL mechanisms with regard to automated article summarization, visualization, and analysis using cognitive services.

Thus, it is important to first have an understanding of how natural language processing in an NL system is implemented before describing how the mechanisms of the illustrative embodiments are integrated in and augment such NL systems. It should be appreciated that the NL mechanisms described in FIGS. 1 and 2 are only examples and are not intended to state or imply any limitation with regard to the type of NL mechanisms with which the illustrative embodiments are implemented. Many modifications to the example NL system shown in FIGS. 1 and 2 may be implemented in various embodiments of the present invention without departing from the spirit and scope of the present invention.

As an overview, a Natural Language system (NL system) is an artificial intelligence application executing on data processing hardware that performs processing pertaining to a given subject-matter domain presented in natural language. The NL system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the NL system. The document may include any file, text, article, or source of data for use in the NL system. For example, an NL system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain. In accordance with the illustrative embodiment, unstructured content may include news reports, journal publications, short stories, novels, research papers, textbooks, Web logs (Wogs), social media postings, or the like. As used herein for the purpose of describing the illustrative embodiments, an article is an item of unstructured content.

FIG. 1 depicts a schematic diagram of one illustrative embodiment of a Natural Language (NL) system 100 in a computer network 102. One example of NL processing is question/answer generation which is described in U.S. Patent Application Publication No. 2011/0125734, which is herein incorporated by reference in its entirety. NL system 100 analyzes natural language to generate solutions not possible with traditional deterministic systems. In some embodiments, NL system 100 is a probabilistic system built on concepts of Artificial Intelligence such as natural language processing, information retrieval, knowledge representation, automated reasoning, and machine learning.

The NL system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The NL system 100 and network 102 enables article summarization functionality for one or more system users via their respective computing devices 110-112. Other embodiments of the NL system 100 may be used with components, systems, sub-systems, and/or devices other than those that are depicted herein.

The NL system 100 is configured to implement an NL system pipeline 108 that receive inputs from various sources. For example, the NL system 100 receives input from the network 102, a corpus of electronic documents 106, system users, and/or other data and other possible sources of input. In one embodiment, some or all of the inputs to the NL system 100 are routed through the network 102. The various computing devices 104 on the network 102 include access points for content creators and system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the NL system 100 may operate in environments of any size, including local and global, e.g., the Internet.

In one embodiment, the content creator creates content in a document of the corpus of data 106 for use as part of a corpus of data with the NL system 100. The document includes any file, text, article, or source of data for use in the NL system 100. System users access the NL system 100 via a network connection or an Internet connection to the network 102, and select articles for summarization to the NL system 100 that are answered by the content in the corpus of data 106. The NL system 100 parses and interprets the article and provides an article summarization to the system user, e.g., system user 110, with augmented information from corpus 106. In some embodiments, the NL system 100 provides a summarization to users with visualizations of data.

The NL system 100 implements an NL system pipeline 108 which comprises a plurality of stages for processing an article and the corpus of data 106. The NL system pipeline 108 generates summarizations for articles based on the processing of the article and the corpus of data 106. In one embodiment, NL system pipeline 108 includes a plurality of software components that are specialized for particular functions, such as labeling parts of speech, identifying sentence structure, identifying entities and entity types (e.g., person, place, date, animal, etc.), and the like. These software components are also referred to as reasoning algorithms. In some embodiments, the software components are configured in various combinations to perform different functions.

In one embodiment, combinations of the software components of NL system pipeline 108 form cognitive services to be used for article summarization. A cognitive service is a service that can be accessed by an application programming interface (API) to perform a function for analysis and understanding of natural language documents or other unstructured content. In one embodiment, the cognitive services include a natural language classifier service, a personality insights service, a concepts insights service, a concept expansion service, a message resonance service, a relationship extraction service, a question and answer service, and a visualization rendering service, which will be described in further detail below.

In some illustrative embodiments, the NI, system 100 may be the IBM Watson™ system available from international Business Machines Corporation of Armonk, N.Y., which is augmented with the mechanisms of the illustrative embodiments described hereafter. More particularly, the IBM Watson™ Developer Cloud provides cognitive services for processing unstructured content for understanding and analysis. NL system 100 performs deep analysis on the language of the article and other content in the corpus of data using a variety of reasoning algorithms. More information about the IBM Watson™ system may be obtained, for example, from the IBM Corporation website, IBM Redbooks, and the like. For example, information about the IBM Watson™ system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with an illustrative embodiment, a natural language (NL) processing system, which may be NL system 100 in one embodiment or may run on another one of servers 104, ingests an article into corpus 106 or processes an article leveraging knowledge gleaned from corpus 106 for understanding, analysis, and summarization. The NL processing system deconstructs the semantic and cognitive processing related to the article using various cognitive services and related offerings. The NL system performs deep semantic parsing and detects entities and relationships within the article. Different types of entities (e.g., real people, fictional characters, location entities, dates, or times) may receive further treatments with the cognitive services. Operation of the NL processing system for performing article summarization is described in further detail below with reference to FIG. 3.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements an NL system 100 and NL system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LIMA® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
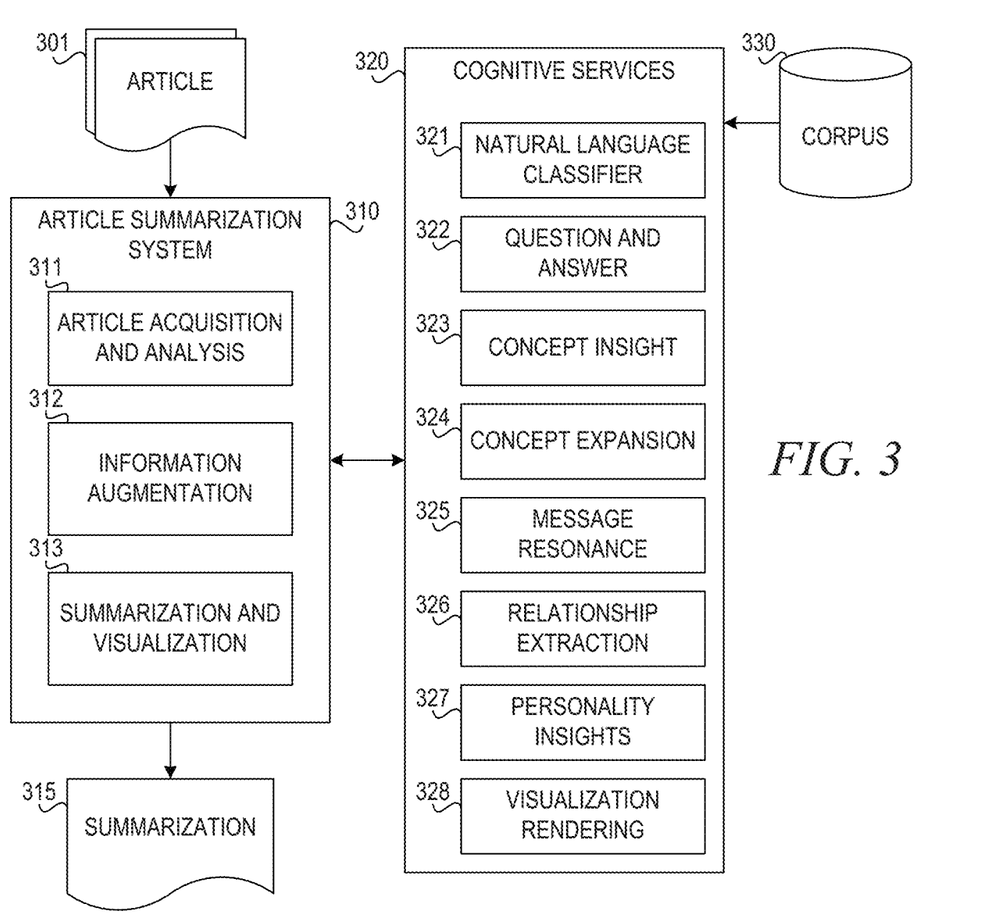
FIG. 3 is a block diagram illustrating an article summarization system in accordance with an illustrative embodiment.

FIG. 3 is a block diagram illustrating an article summarization system in accordance with an illustrative embodiment. Article summarization system 310 receives one or more articles 301 for understanding, analysis, and summarization. Article summarization system 310 may receive a single article, such as a text book, a novel, a news report, a research paper, or the like. Alternatively, article summarization system 310 may receive a plurality of articles, such as a book of short stories, a newspaper, an academic or industry journal, a magazine, or the like. For the purposes of describing the illustrative embodiments, the following discussion will focus on performing summarization of a single article; however, article summarization system 310 performs the same processing, analysis, and summarization for a plurality of articles.

Article summarization system 310 includes article acquisition and analysis component 311, information augmentation component 312, and summarization and visualization component 313. Article summarization system 310 communicates with and uses cognitive services 320 to help individual processing and collective analyses. In the depicted example, cognitive services 320 include natural language classifier service 321, question and answer service 322, concept insight service 323, concept expansion service 324, message resonance service 325, relationship extraction service 326, personality insights service 327, and visualization rendering service 328. Cognitive services 320 may include more or fewer services within the spirit and scope of the illustrate embodiments. In one example embodiment, cognitive services 320 may be the IBM Watson™ Services provided through the IBM Watson™ Developer Cloud. In one embodiment, cognitive services 320 provide application programming interfaces (APIs) to allow access by article summarization system 310.

Natural language classifier service 321 uses machine learning algorithms to assist in understanding the language of natural language texts and to make predictions about how to handle the texts. Natural language classifier service 321 learns from examples and then returns information for new texts. Natural language classifier service 321 analyzes a string of text and assigns predefined categories by applying deep learning technology. Deep learning is a set of approaches that use algorithms with similarities to the way a human brain works.

Question and answer (QA) service 322 uses a corpus of information 330, which provides domain knowledge based on a specific set of input documents and other information. QA service 322 receives an input question, parses the question to extract the major features of the question, uses the extracted features to formulate queries, and then applies those queries to the corpus of data 330. Based on the application of the queries to the corpus of data, the QA service 322 generates a set of hypotheses, or candidate answers to the input question, by looking across the corpus of data for portions of the corpus of data that have some potential for containing a valuable response to the input question. The QA service 322 then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may took at the matching of terms and synonyms within the language of the input question and the found portions of the corpus of data 330. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA service 322. The statistical model is used to summarize a level of confidence that the QA service 322 has regarding the evidence that the potential response, i.e. candidate answer, is inferred by the question. This process is repeated for each of the candidate answers until the QA service 322 identifies candidate answers that surface as being significantly stronger than others and thus, generates a final answer, or ranked set of answers, for the input question.

As mentioned above, QA service 322 operates by accessing information from a corpus of data or information 330

(also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data 330 allows the QA service 322 to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA service 322. Content creators, automated tools, or the like, annotate or otherwise generate metadata for providing information useable by the QA service 322 to identify these question and answer attributes of the content.

Operating on such content, the QA service 322 generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

QA service 322 may itself use other cognitive services 320. For example, QA service 322 may use natural language classifier service 321, concept insight service 323, concept expansion service 324, and relationship extraction service 326 for analyzing the input question and information in corpus 330.

Concept insights service 323 identifies conceptual associations in input content. Concept insights service 323 automatically tags input concept against a concept graph, which is a formal representation of the relationships between concepts that are present in the data on which it is based. For example, concept insights service 323 may identify types of entities, such as real people, fictional characters, locations, and dates or times.

Concept expansion service 324 expands and enriches a concept set to boost performance of analytics. Concept expansion service 324 learns by example, taking a known concept and learning additional, similar terminology. For example, concept expansion service 324 could interpret "The Big Apple" as meaning "New York City." Concept expansion service 324 may create a dictionary of related words and concepts so that euphemisms, colloquialisms, or otherwise unclear phrases can be better understood and analyzed.

Message resonance service 325 analyzes draft content and scores how well the content is likely to be received by a specific target audience. In one embodiment, message resonance service 325 bases analysis on content that has been written by the target audience itself, such as fans of a specific sports team or new parents.

Relationship extraction service 326 extracts useful information from input text and returns metadata derived from the sentences of the input text. The output includes natural language parse trees and detailed grammatical information about the elements of the text, such as entities and the relationships that exist among them. In one embodiment, relationship extraction service 326 produces results as extensible markup language (XML) output. Relationship extraction service 326 parses sentences into components and detects relationships between entities within the input text. Relationship extraction service 326 processes new terms, such as names in a news feed, through contextual analysis. Sentence components include parts of speech (noun, verb, adjective, conjunction, etc.) and functions subjects, objects predicates, etc.). Relationship extraction service 326 maps the relationships between components so that users or analytics engines can more easily understand the meaning of individual sentences and documents.

Personality insights service 327 derives insights from input text, as well as social media, enterprise data, digital communications, or other information, such as information from corpus 330. Personality insights service 327 uses linguistic analytics to infer personality and social characteristics, including Big Five, Needs, and Values, from text.

Big Five personality characteristics represent the most widely used model for generally describing how a person engages with the world. The model includes five primary characteristics or dimensions: agreeableness, conscientiousness, extraversion, emotional range, and openness. Agreeableness is a person's tendency to be compassionate and cooperative towards others. Conscientiousness is a person's tendency to act in an organized or thoughtful way. Extraversion is a person's tendency to seek stimulation in the company of others. Emotional range, also referred to as neuroticism or natural reactions, is the extent to which a person's emotions are sensitive to the person's environment. Openness is the extent to which a person is open to experiencing a variety of activities. Each of the top-level dimensions has six facets that further characterize an individual according to the dimension.

Needs describe which aspects of a product or idea will resonate with a person. The model includes twelve characteristic needs: excitement, harmony, curiosity, ideal, closeness, self-expression, liberty, love, practicality, stability, challenge, and structure.

Values describe motivating factors that influence a person's decision making. The model includes five dimensions of human values: self-transcendence/helping others, conservation/tradition, hedonism/taking pleasure in life, self-enhancement/achieving success, and open to change/excitement.

Visualization rendering service 328 provides visualization for multiple forms of data. Visualization rendering service 328 uses human-readable text language to describe a chart by a composable set of features. For example, a pie chart is a composition of: an interval element (which make the pie slices), polar transform (to transform the intervals into slices), stacking operation (to place the slices on top of each other), and color and labeling aesthetics (to color and label the slices).

Visualization rendering service 328 has many benefits over typical type-based system. Most important is infinite chart flexibility: using visualization rendering service 328, a designer can build a custom chart extremely easily by adding and composing features to make the ideal chart to fit the data, rather than spending their time manipulating data to fit it to a certain chart type. For visualization rendering service 328, a "chart type" is simply a piece of language, so creating a new chart is as simple as creating or processing a new text document. One example of visualization rendering service 328 is the IBM Rapidly Adaptive Visualization Engine (RAVE), which is available through the IBM Watson™ Developer Cloud.

In one embodiment, article acquisition and analysis component 311 receives article 301 for ingestion into a corpus of information or as an overall process for summarizing a catalog of articles or other unstructured content. Article acquisition and analysis component 311 uses cognitive services 320 and other reasoning algorithms, techniques, or software components to normalize the media type by performing deep semantic parsing, detecting entities and relationships, and annotating or tagging the text. In one embodiment, article acquisition and analysis component 311 uses natural language classifier service 321 to classify the article to determine an article type, uses concept insight service 323 and concept expansion service 324 to identify types of entities in the article, and uses relationship extraction service 326 to identify relationships between entities.

Information augmentation component 312 performs augmentation functions on the entities found in the article. Information augmentation component 312 uses cognitive services 320 to discover additional information about the entities. For real person entities, information augmentation component 312 uses question and answer service 322 to research information in corpus 330. Information augmentation component 312 forms questions that provide input to QA service 322, which returns one or more high confidence answers.

In one embodiment, information augmentation component 312 determines a domain based on the article type to focus processing on a particular corpus 330 of information. Information augmentation component 312 may also determine particular types of information, entities, and relationships to focus on based on the article type. For example, if the article 301 is biographical, information augmentation component 312 may focus on information concerning dates and locations.

As an example, consider article 301 is a biography of Benjamin Franklin, and article 301 mentions that Benjamin Franklin signed the Declaration of Independence. Information augmentation component 312 uses concept insight service 323 and slot filler templates to form questions. Each slot of a slot filler template has a specific part of speech and label. Information augmentation component 312 inserts the identified entities into the slots of the slot filler templates to generate questions. An example slot filler template may be as follows: "When did <person> <verb> <object>?" Given the identified entities, information augmentation component 312 may generate the following question: "When did Benjamin Franklin sign the Declaration of Independence?" Similarly, information augmentation component 312 may generate the question: "Where did Benjamin Franklin sign the Declaration of Independence?" Other known techniques for generating questions may also be used in the illustrative embodiments.

Thus, information augmentation component 312 discovers further information about the entities in article 301 by submitting questions to QA service 322 and receiving answers. In the above example, information augmentation component 312 would discover a time (1776) and place (Philadelphia) for a particular event (the signing of the Declaration of independence). Information augmentation component 312 could generate further deepening questions to submit to QA service 322 to augment the information from article 301.

In one embodiment, for real person entities, information augmentation component 312 uses personality insights service 327 to analyze documents written by the entity in corpus 330. For the example of article 301 being a biography of Benjamin Franklin, information augmentation component 312 may use personality insights service 327 to analyze Benjamin Franklin's writings, including essays, newspaper articles, and letters, contained in corpus 330. For a more current real person entity, personality insights service 327 may analyze papers, letters, social media posts, microblog posts, forum posts, and the like.

Information augmentation component 312 may also identify relationships between the real person entity and other real person entities, places the real person entity has lived or appeared, significant dates in the life of the real person entity, and so forth. Information augmentation component 312 may discover this supplemental information by using cognitive services 320.

For fictional characters, such as a protagonist in a novel, information augmentation component 312 may determine locations, dates, and times of key events in article 301 similar to the manner in which information augmentation component 312 discovers information for real person entities. In addition, information augmentation component 312 may use personality insights service 327 and/or message resonance service 325 to analyze quotations and dialog in article 301 to determine personality characteristics or traits.

Information augmentation component 312 associates location entities with a map and references excerpts of article 301 and other content from corpus 330. For the above example, information augmentation component 312 may determine the location of Philadelphia on a map and discover further information about the city of Philadelphia or the state of Pennsylvania.

Information augmentation component 312 may collect dates and times to produce a timeline. Information augmentation component 312 may also reference information in corpus 330 for specific dates and times.

Summarization and visualization component 313 then generates one or more visualization components, such as maps, personality charts, relationship graphs, concept graphs, timelines, pie charts, bar graphs, or the like. Summarization and visualization component 313 then presents the one or more visualization components as summarization 315 in a consolidated manner for efficient human understanding. Summarization 315 presents an overall summarization of the key contents of article 301 with augmented information. Summarization 315 with the one or more visualization components lends itself to more efficient processing of the article 301 and also enables more efficient and automated collective analysis of articles.

In one embodiment, summarization and visualization component 313 determines the one or more visualization components based on the article type. For example, if article 301 is biographical, summarization and visualization component 313 may select timelines, maps, and personality charts. If article 301 is a financial document, summarization and visualization component 313 may select graphs, bar charts, pie charts, and the like.

In one embodiment, the one or more visualization components in summarization 315 provide references to excerpts of article 301 and augmented information from corpus 330. Thus, the user may select a location on a map, an event on a timeline, a statistic in a pie or bar chart, a personality characteristic or trait, an entity, or a concept and read portions of article 301 that are of particular interest. The user may also access reference material to learn more about an entity or concept beyond what is mentioned in article 301. Furthermore, charts or graphs may include drill-down functionality to receive more information about a statistic or the like.

Figure 4:
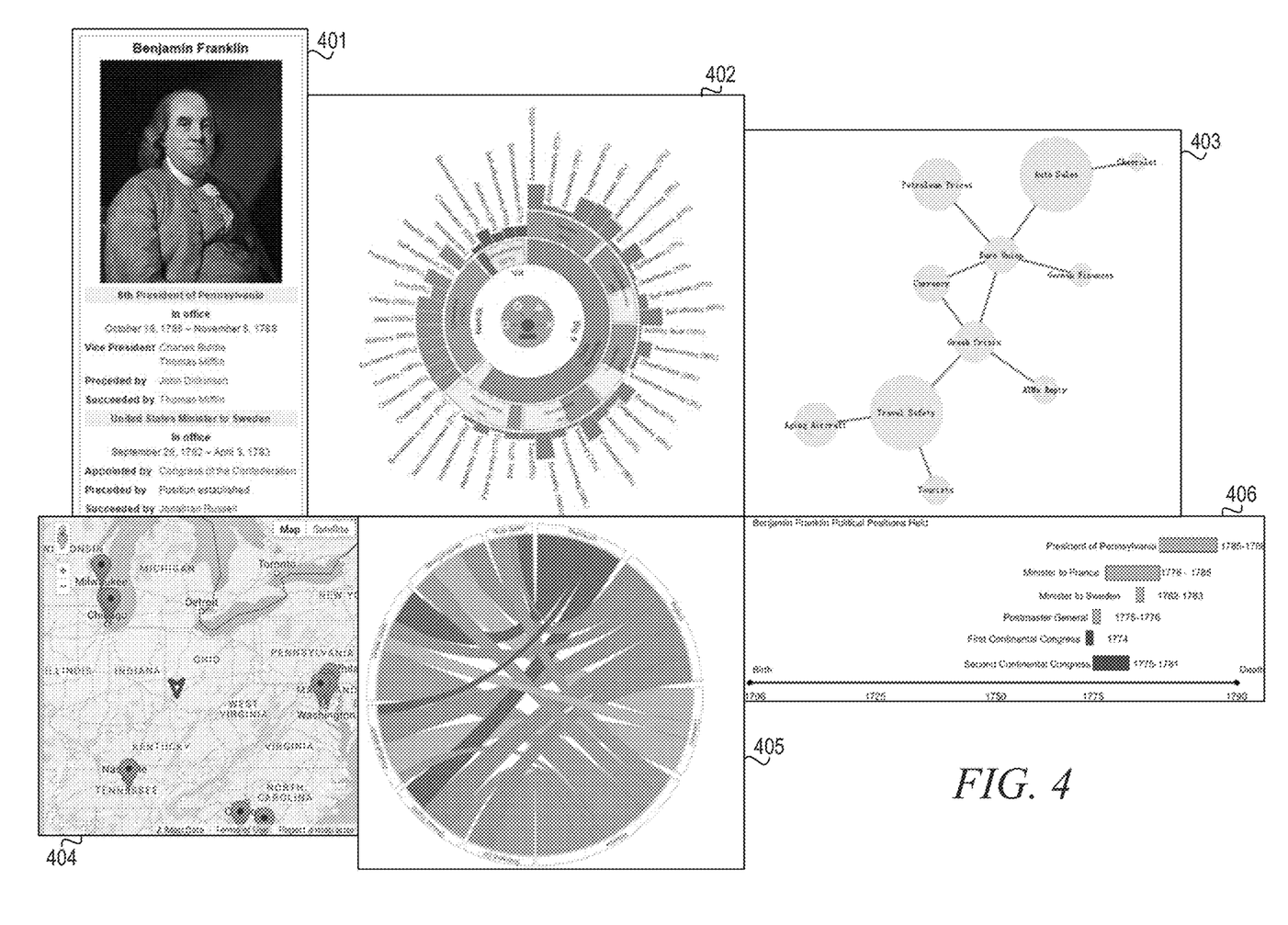
FIG. 4 depicts an example summarization including visualization components in accordance with an illustrative embodiment.

FIG. 4 depicts an example summarization including visualization components in accordance with an illustrative embodiment. Based on output from the analysis component and the augmentation component, the summarization and visualization component uses specific visualizations. If the entity is a historical figure, the summarization and visualization component can pull from a set of visualizations of the figure's life. Augmentation of the information gives more information about the figure than the information found in the article. For each type of subject, the article summarization system uses the most fitting approaches to give context to the subject.

Using cognitive services, the article summarization system extracts significant information about the subjects within the article. This includes the subjects, their classifications, and any relationships or actions they take. The summarization provides information within the article that affects the concerns of user. The article summarization system can take the user's concerns and present articles related to those concerns, allowing the user to see which articles apply to his or her concerns.

The example shown in FIG. 4 illustrates the extraction of an entity, the historical political figure Benjamin Franklin, and how the article summarization system can represent information extracted from the article in addition to augmentation from multiple resources. The summarization includes visualizations 401-406. Visualization 401 presents a Wikipedia article that supplements the subject to build greater understanding.

From the augmented information, the article summarization system identifies that the subject has writings and speech transcripts from which the personality insights service can build a personality profile of the subject. Visualization 402 presents the subject's personality profile based on his writings.

In some cases, the article summarization system looks for trends in articles related to each other to give insight on how the different articles are interrelated. Using visualizations, the article summarization system builds a view of the relationships between the concepts or subjects within the articles. Visualization 403 presents a concept graph of related concepts and subjects mentioned in or related to the article.

In some situations, events may happen in a locality. This may highlight a significant news event occurring in an area of concern. In that case, the article summarization system uses the location information augmentation from the article and lays out the articles on a map. Visualization 404 presents a map showing locations of events mentioned in the article or related to the article.

Visualization 405 presents relationships between information within an article. For instance, a set of articles, on the left side of the circle, are mapped to how much content is related to a set of subjects, on the right side of the circle, that interest an investor.

In addition, the article summarization 5 stem recognizes that there are significant events for the subject and builds a timeline representation of the events. If the subject of an article is a significant player in some global events, the article summarization system adds that information to a timeline to provide context of the subject's actions. Visualization 406 presents a timeline of significant events in the life of Benjamin Franklin, the subject of the article.

The present invention may be a system, a method, and/or a computer program product. The computer program product may include a computer readable storage medium having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention, it will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
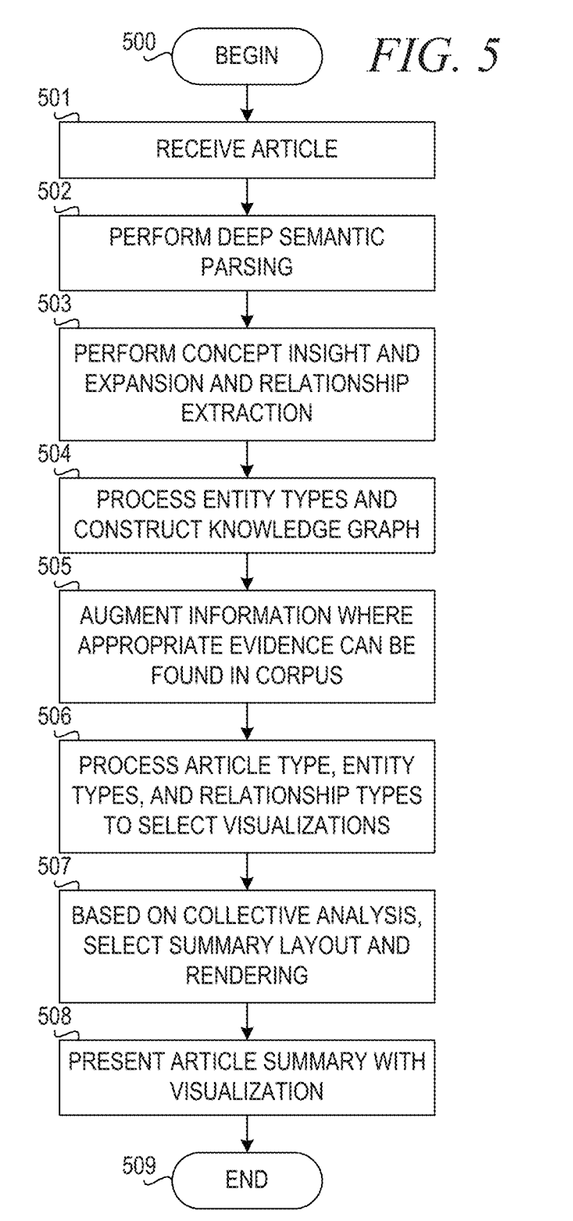
FIG. 5 is a flowchart illustrating operation of an article summarization system with visualization using cognitive services in accordance with an illustrative embodiment.

FIG. 5 is a flowchart illustrating operation of an article summarization system with visualization using cognitive services in accordance with an illustrative embodiment. Operation begins (block 500), and the system receives an article (block 501). The system performs deep semantic parsing on the article (block 502). The system performs concept insight and expansion and relationship extraction using cognitive services (block 503). The system then processes entity types and constructs a knowledge graph (block 504).

The system augments information where appropriate evidence can be found in the corpus (block 505). As described above, the system may use cognitive services to augment information. For example, the system may use slot filler templates to generate questions. The system may then submit the generated questions to a question and answer service and receive high confidence answers to augment the information discovered from the article. The system may also use a personality insights service to discover personality characteristics or traits for a real person or fictional character. The personality insights service may analyze quotations and dialog in the article, actual writings, social media posts, and the like. In addition, the system may retrieve maps, articles, and timelines from the corpus.

Next, the system processes the article type, entity types, and relationship types to select visualizations (block 506). Based on collective analysis, the system selects a summary layout and rendering (block 507). The system then presents the article summary with visualizations (block 508), and operation ends (block 509).

The summarization layout presents one or more selected visualizations to form an overall summarization of the key contents in the article. In one embodiment, the one or more visualizations provide references to excerpts of the article and augmented information from the corpus. The user may select a location on a map, an event on a timeline, a statistic in a pie or bar chart, a personality characteristic or trait, an entity, or a concept and read portions of the article that are of particular interest. The user may also access reference material to learn more about an entity or concept beyond what is mentioned in the article. Furthermore, charts or graphs may include drill-down functionality to receive more information about a statistic or the like.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart, illustration, can be implemented by special purpose hardware-based systems that perform the specified functions or acts or carry out combinations of special purpose hardware and computer instructions.

The illustrative embodiments reduce human cognitive workloads by providing efficient summarization services in a visual manner. The illustrative embodiments allow for collective analysis of article types. The mechanisms of the illustrative embodiments have applicability in pattern detection and analysis as well as predicting user sentiment. The illustrative embodiments may provide objective recommender systems. The system may present summarizations of articles to users for fast and efficient review. Thus, the system may determine user preferences and sentiment to more efficiently determine recommended content.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for article summarization, the method comprising:

analyzing, by the data processing system, an article to identify entities and relationships within the article using one or more of a plurality of cognitive services, wherein the article is an item of unstructured content, wherein the plurality of cognitive services includes a natural language classifier service, a question and answer service, a concept insight service, a concept expansion service, a message resonance service, a relationship extraction service, and a personality insights service, and wherein analyzing the article comprises using the concept insight service and the concept expansion service to identify types of the entities in the article, identifying a given entity as a person entity, and using the personality insights service to analyze documents in the corpus of electronic documents to determine personality traits of the person entity;

performing, by the data processing system, information augmentation based on the identified entities and relationships to collect augmented information from a corpus of electronic documents using one or more of the plurality of cognitive services to collect the augmented information from the corpus of electronic documents, wherein performing information augmentation further comprises forming questions about a given entity, submitting the questions to the question and answer service, and receiving one or more high confidence answers from the question and answer service based on the corpus of electronic documents;

generating, by the data processing system, one or more visualization components based on the identified entities and relationships and the augmented information, wherein the one or more visualization components comprise a personality chart based on the personality traits of the person entity; and presenting, by the data processing system, a summarization comprising the one or more visualization components to a user.

2. The method of claim 1, wherein analyzing the article further comprises using the natural language service to classify the article to determine an article type.

3. The method of claim 2, wherein performing information augmentation further comprises determining particular types of information, entities, and relationships to focus on based on the article type.

4. The method of claim 2, wherein generating the one or more visualization components comprises determining the one or more visualization components based on the article type.

5. The method of claim 1, wherein analyzing the article further comprises using the relationship extraction service to identify relationships between the entities.

6. The method of claim 1, wherein identifying the person entity comprises identifying a real person entity and wherein performing information augmentation further comprises using the personality insights service to analyze documents written by the real person entity in the corpus of electronic documents to determine the personality traits.

7. The method of claim 1, wherein identifying the person entity comprises identifying a fictional person entity and wherein performing information augmentation further comprises using the personality insights service or a message resonance cognitive service to analyze quotations or dialog in the article to determine the personality traits.

8. The method of claim 1, wherein performing information augmentation comprises determining locations, dates, and times of key events in the article.

9. The method of claim 1, wherein performing information augmentation comprises associating location entities with a map and referencing excerpts of the article and content from the corpus of electronic documents.

10. The method of claim 1, wherein performing information augmentation comprises collecting dates and times to produce a timeline and referencing information in the corpus of electronic documents.

11. The method of claim 1, wherein generating the one or more visualization components comprises using at least one cognitive service to generate the one or more visualization components, wherein the at least one cognitive service comprises a visualization rendering service.

12. The method of claim 1, wherein the one or more visualization components comprise at least one of a map, a personality chart, a relationship graph, a concept graph, a timeline, a pie chart, or a bar graph.

13. The method of claim 2, wherein performing information augmentation further comprises determining a domain based on the article type and focusing processing on the corpus of electronic documents based on the domain.

14. A computer program product comprising a computer readable storage medium having a computer readable program stored therein, wherein the computer readable program, when executed on a computing device, causes the computing device to:

analyze an article to identify entities and relationships within the article using one or more of a plurality of cognitive services, wherein the article is an item of unstructured content, wherein the plurality of cognitive services includes a natural language classifier service, a question and answer service, a concept insight service, a concept expansion service, a message resonance service, a relationship extraction service, and a personality insights service, and wherein analyzing the article comprises using the concept insight service and the concept expansion service to identify types of the entities in the article, identifying a given entity as a person entity, and using the personality insights service to analyze documents in the corpus of electronic documents to determine personality traits of the person entity;

perform information augmentation based on the identified entities and relationships to collect augmented information from a corpus of electronic documents using one or more of the plurality of cognitive services to collect the augmented information from the corpus of electronic documents, wherein performing information augmentation further comprises forming questions about a given entity, submitting the questions to the question and answer service, and receiving one or more high confidence answers from the question and answer service based on the corpus of electronic documents;

generate one or more visualization components based on the identified entities and relationships and the augmented information, wherein the one or more visualization components comprise a personality chart based on the personality traits of the person entity; and present a summarization comprising the one or more visualization components to a user.

15. The computer program product of claim 14, wherein analyzing identifying the person entity comprises identifying a real person entity and wherein performing information augmentation further comprises using the personality insights service to analyze documents written by the real person entity in the corpus of electronic documents to determine the personality traits.

16. The computer program product of claim 14, wherein identifying the person entity comprises identifying a fictional person entity and wherein performing information augmentation further comprises using the personality insights service or a message resonance cognitive service to analyze quotations or dialog in the article to determine the personality traits.

17. The computer program product of claim 14, wherein analyzing the article further comprises using the natural language service to classify the article to determine an article type and wherein performing information augmentation further comprises determining a domain based on the article type and focusing processing on the corpus of electronic documents based on the domain.

18. An apparatus comprising:

a processor, and a memory coupled to the processor, wherein the memory comprises instructions which, when executed by the processor, cause the processor to:

analyze an article to identify entities and relationships within the article using one or more of a plurality of cognitive services, wherein the article is an item of unstructured content, wherein the plurality of cognitive services includes a natural language classifier service, a question and answer service, a concept insight service, a concept expansion service, a message resonance service, a relationship extraction service, and a personality insights service, and wherein analyzing the article comprises using the concept insight service and the concept expansion service to identify types of the entities in the article, identifying a given entity as a person entity, and using the personality insights service to analyze documents in the corpus of electronic documents to determine personality traits of the person entity;

perform information augmentation based on the identified entities and relationships to collect augmented information from a corpus of electronic documents using one or more of the plurality of cognitive services to collect the augmented information from the corpus of electronic documents, wherein performing information augmentation further comprises forming questions about a given entity, submitting the questions to the question and answer service, and receiving one or more high confidence answers from the question and answer service based on the corpus of electronic documents;

generate one or more visualization components based on the identified entities and relationships and the augmented information, wherein the one or more visualization components comprise a personality chart based on the personality traits of the person entity; and present a summarization comprising the one or more visualization components to a user.

19. The apparatus of claim 18, wherein identifying the person entity comprises identifying a real person entity and wherein performing information augmentation further comprises using the personality insights service to analyze documents written by the real person entity in the corpus of electronic documents to determine the personality traits.

20. The apparatus of claim 18, wherein identifying the person entity comprises identifying a fictional person entity and wherein performing information augmentation further comprises using the personality insights service or a message resonance cognitive service to analyze quotations or dialog in the article to determine the personality traits.

\* \* \* \* \*